(12) United States Patent
Mohan et al.

(10) Patent No.: US 11,778,112 B2
(45) Date of Patent: Oct. 3, 2023

(54) METHODS AND SYSTEMS FOR RESERVING A TRAY FOR SPECIAL MEDIA PRINTING WHILE SUBMITTING A DOCUMENT FOR PRINTING

(71) Applicant: XEROX CORPORATION

(72) Inventors: Nisha Mohan, Chennai (IN); Ponnovian Parthasarathy, Chennai (IN); Purushothaman Jayakumar, Chennai (IN); Duraimurugan Krishnasamy, Chengalpattu District (IN); Narayan Kesavan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/578,617

(22) Filed: Jan. 19, 2022

(65) Prior Publication Data
US 2023/0231960 A1    Jul. 20, 2023

(51) Int. Cl.
*H04N 1/00* (2006.01)
*G06F 3/12* (2006.01)
*H04N 1/23* (2006.01)

(52) U.S. Cl.
CPC ....... *H04N 1/00633* (2013.01); *G06F 3/1205* (2013.01); *G06F 3/1258* (2013.01); *H04N 1/2353* (2013.01)

(58) Field of Classification Search
CPC ............ H04N 1/00633; H04N 1/2353; G06F 3/1205; G06F 3/1258
See application file for complete search history.

(56) References Cited

U.S. PATENT DOCUMENTS

| | | | |
|---|---|---|---|
| 6,647,222 B1 | 11/2003 | Digby et al. | |
| 8,009,302 B2 | 8/2011 | Martin | |
| 8,823,987 B2 | 9/2014 | Sponable et al. | |
| 9,798,962 B2 | 10/2017 | Iida | |
| 2006/0282590 A1* | 12/2006 | Yoshimura | G06F 3/1238 710/260 |
| 2007/0079227 A1* | 4/2007 | Singh | G06F 40/103 715/764 |
| 2009/0279115 A1* | 11/2009 | Martin | G06F 3/1204 358/1.13 |
| 2010/0296830 A1* | 11/2010 | Kamata | G03G 15/6508 399/81 |
| 2015/0029549 A1* | 1/2015 | Murata | G06K 15/1809 358/1.15 |
| 2022/0179350 A1* | 6/2022 | Hasegawa | G03G 15/55 |
| 2022/0350920 A1* | 11/2022 | Rathnakar | G06F 21/608 |
| 2022/0405023 A1* | 12/2022 | Kojima | G03G 15/6508 |

* cited by examiner

*Primary Examiner* — Iriana Cruz

(57) ABSTRACT

The disclosure discloses methods and systems for allowing a user to reserve a tray for special media printing while submitting a document for printing, the method is implemented at a print driver application running on a computing device. The method includes receiving a print request for the document through the print driver application. A user interface is provided to the user including one or more print attributes, wherein at least one print attribute includes special media option. Upon selection of the special media option, a list of one or more trays available at at least one multi-function device for special media printing is displayed. Thereafter, the user is allowed to select a tray from the displayed tray list for reservation for special media printing at the at least one multi-function device.

21 Claims, 14 Drawing Sheets

METHODS AND SYSTEMS FOR RESERVING A TRAY FOR SPECIAL MEDIA PRINTING WHILE SUBMITTING A DOCUMENT FOR PRINTING

TECHNICAL FIELD

The present disclosure relates to the field of printing. More specifically, the disclosure relates to methods and systems for reserving a tray for a user for special media printing while submitting a document for printing.

BACKGROUND

Typically, multi-function devices use regular media sheets (such as plain media type) for printing various documents received from multiple users in an organization. But there are requirements when one or more users need special media printing. For example, a user requires to print a document or content on a special media such as a letterhead. In second example, another user requires to print a document on glossy papers. These are just two examples, but special media printing may be needed for various other reasons such as a job offer letter for a new employee is to be printed on a letterhead, or legal content needs to be printed on legal bond and so on.

For special media printing scenarios, a user first loads the desired special media in a tray of a multi-function device and submits a document for printing from his device for printing on the loaded special media, say, letterhead. This way, the user typically prints his document on the desired special media. However, there are scenarios where before the user (say user A) submits the document for printing to the multi-function device, some other user (such as user B) may select the same media type/tray and submits a document for printing. In such cases, the document received from another user (user B) gets printed on the special media as the user B is not even aware of the media loaded by the user A for printing his document on the letterhead.

In detail, a user such as user A wishes to print a document on a special media, say legal bond. Here, the user A loads the legal bonds in a tray, say tray 2 of the multi-function device. Before the user A submits the document for printing to the multi-function device, another user such as user B selects the same tray i.e., tray 2 or media type legal bond while submitting his document for printing. Here, the multi-function device processes the document of the user B and prints his document on the legal bond paper. Here, the multi-function device simply processes the document based on a job queue and selection of print attributes by the user B as the device is not aware of who loaded the legal bond papers in the tray 2. Similarly, the user B is not aware of any special media in tray 2 loaded by the user A for printing his documents.

In another scenario, a tray, say tray 2 of the multi-function device is loaded with a special media, say letterhead. But the user A wishes to print his document on another special media, say transparent papers. Here, the user A loads the transparent papers in the tray 2 to print his document. Before the user A submits his document for printing with the selection of tray 2, another user such as user B wants to print his document on the letterhead and selects the tray 2 considering the tray 2 includes the letterhead. The multi-function device again prints the document received from the user B and his document gets printed on the transparent papers which are originally loaded by the user A for printing his document.

In third scenario, the user A requires to print important content in special media, say letterhead and another user B is required to print his content in another letterhead. Despite both the user A and user B set the media type in different trays, there are chances that both the letterheads may get swapped. Here, the content of the user A gets printed in user's B letterhead and the user B content gets printed in user's A letterhead.

In all such scenarios, the user A requires to print his document again. Such situations may frustrate the user A and may further increase the confusion between the user A and user B. This may additionally result into wastage of resources such as pages, toner/ink, due to redundant printing. In the known solutions, there is no guarantee that any other user's job such as user B job is not printed in special media loaded by a different user, i.e., user A. In this light, there is a need for improvised methods and systems to handle special media printing.

SUMMARY

According to aspects illustrated herein, a method for allowing a user to reserve a tray in a multi-function device for special media printing while submitting a document for printing is disclosed, the method is implemented at a print driver application running on a computing device. The print driver application being operative of at least one multi-function device. The method includes receiving a print request for the document through the print driver application. A user interface is provided to the user including one or more print attributes, wherein at least one print attribute includes special media type. Upon selection of the special media type, a list of one or more trays available at the at least one multi-function device for special media printing is displayed. Thereafter, the user is allowed to select a tray from the displayed list for reservation for special media printing at the at least one multi-function device.

According to further aspects illustrated herein, a computing device for allowing a user to reserve a tray for special media printing while submitting a document for printing is disclosed. The computing device is communicatively coupled to at least one multi-function device. The computing device includes a print driver application running on the computing device for: receiving a print request for the document; providing a user interface to the user including one or more print attributes, wherein at least one print attribute includes special media option; upon selection of the special media option, displaying a list of trays available at the at least one multi-function device, for special media printing: and allowing the user to select a tray for reservation for special media printing at the at least one multi-function device.

According to furthermore aspects illustrated herein, a system for allowing a user to reserve a tray for special media printing while submitting a document for printing is disclosed. The system includes: a computing device running a print driver application for: receiving a request for printing a document from a user; providing a user interface to the user including one or more print attributes, wherein at least one print attribute includes special media option; upon selection of the special media option, displaying a list of trays available at at least one multi-function device, for special media printing; and allowing the user to select a tray for reservation for special media printing at the at least one multi-function device; and sending the user's request to reserve the selected tray to at the least one multi-function device. The system includes the at least one multi-function device communicatively coupled to the computing device for: reserving the selected tray for the user based on a user ID of the user and a tray ID of the selected tray at the least one multi-function device; authenticating the user upon loading one or more special media sheets in the reserved tray; and printing the document of the user on the one or more special media sheets loaded in the reserved tray, based on successful authentication.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
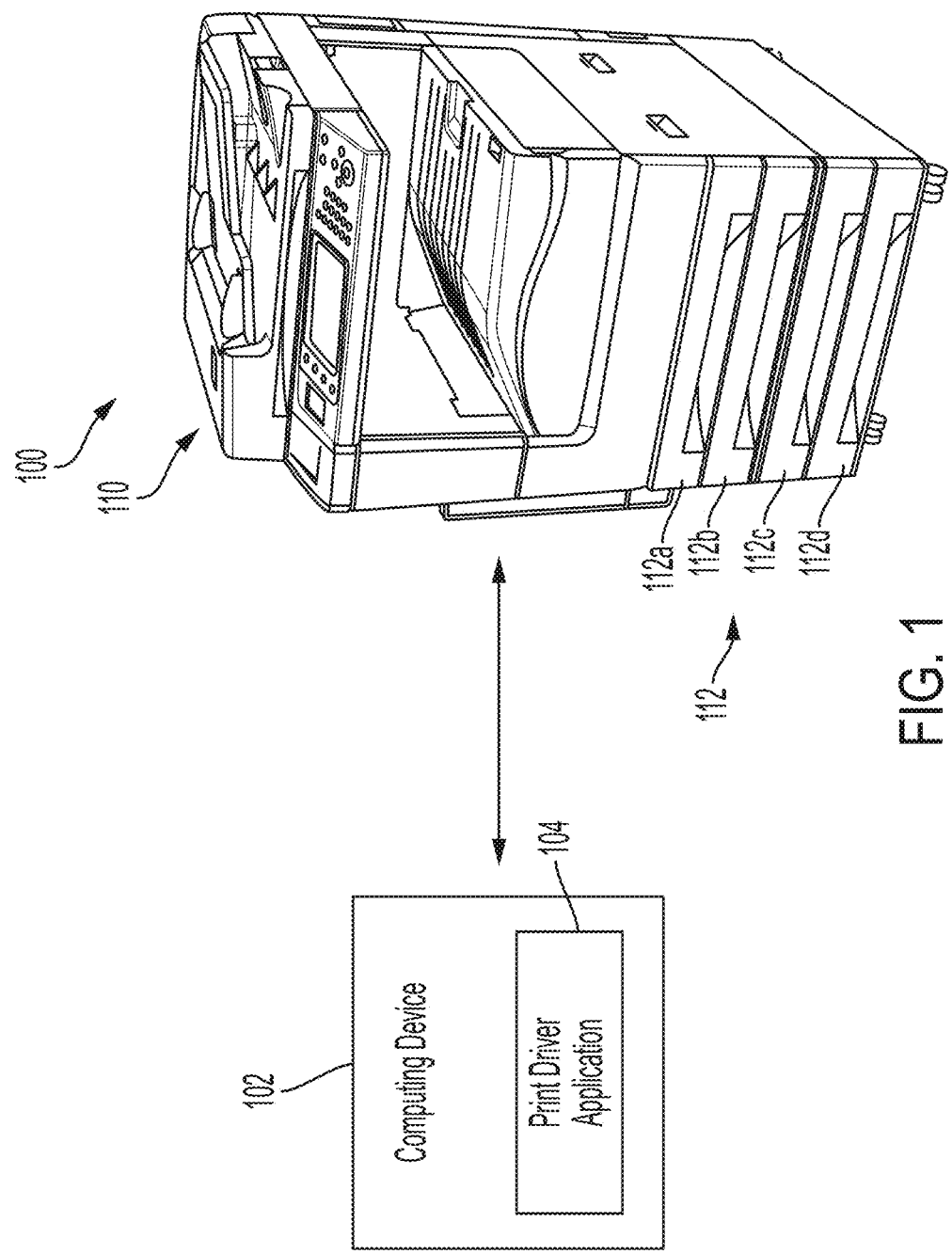
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device for performing one or more functions such as, but not limited to, printing, imaging, scanning, copying and so forth. The multi-function device may include software, hardware, firmware, or a combination thereof. In the context of the current disclosure, the multi-function device reserves a tray for a user for special media printing based on a request from a user and/or a computing device. Before using the reserved tray or printing any document using the reserved tray, the multi-function device performs authentication to ensure that the document of the user who reserved the tray is printed using the reserved tray. The tray is reserved for the user such that the multi-function device prints one or more documents of the user using the reserved tray instead of printing any other user's document using the reserved tray.

The term "document" refers to any digital document submitted by the user for special media printing. The document may include content in the form of text, images, graphics, or a combination thereof. The document may be referred to as content without limiting the scope of the disclosure. The document submitted is in the digital or electronic form.

The term "computing device" refers to a device that the user typically uses for his day-to-day work, submitting print commands and other purposes. Examples of the computing device include, but are not limited to, a personal computer, a desktop, a laptop, a mobile phone, a mobile device, a tablet, a Personal Digital Assistant (FDA), a smart-phone or any other device capable of data communication and/or print submission. The computing device includes a print driver application that allows the user to submit documents for printing, one or more print parameters, and so on. In context of the current disclosure, the print driver application allows the user to reserve a tray for special media printing while submitting the document for printing. Later the document of the user is printed using one or more special media sheets loaded in the reserved tray, based on successful authentication.

The term "special media" refers to a special type of paper on which the document or content of the document can be printed. Various examples of the special media include letterheads, bond papers, transparent sheets, glossy sheets, cardstock, or the like. Typically, different special media is used for printing different types of content. For example, a job offer letter can be printed on company's letterhead, but a legal document requires to be printed on legal bond papers.

The term "reserve" refers to dedicating a tray for a particular user for printing his documents/content on special media sheets as loaded by him in that tray. The tray can be reserved for a pre-defined time or till documents of the user are printed successfully. Alternatively, the tray can be reserved till the special media sheets as loaded in the reserved tray are used or taken out from that tray. Once the tray is reserved for the user, no other user can print his document/content using special media sheets in the reserved tray.

The term "mapping" refers to linking a tray ID with a user ID for reserving the tray for that user for printing his document/content on special media sheets. The mapping also includes maintaining or storing the association of the tray ID with the user ID for later retrieval and/or use such as printing. The mapping may include additional parameters, for example, linking the tray ID with the user ID as well as with media type and so on.

The term "pre-defined time" refers to a time window till the tray is reserved for a particular user. The pre-defined time may be pre-set in the multi-function device or may be changed at later stages. For example, the pre-defined time may be 5 mins, 10 mins, 15 mins, 20 mins and so on. The pre-defined time can be set by an admin user of the multi-function device.

The term "revoke" refers to making the reserved tray available for all users after the pre-defined time is lapsed or documents of the user are printed successfully, or the loaded media sheets are taken out from the reserved tray. The tray reservation can be revoked if the one or more special media sheets are not loaded by the user within a pre-defined time such as 5 mins, 10 mins, 15 mins and so on. The tray reservation can be revoked when at least one of the above occurs. These are few exemplary scenarios but there can be other scenarios for revoking tray reservation.

Overview

The present disclosure discloses methods and systems for allowing a user to reserve a tray for special media printing. The methods and systems allow the user to reserve the tray for printing a document, while submitting the document for printing from his device such as a computing device or a mobile device. At the time of print submission, the user selects special media option and a tray from a list of one or more available trays. Based on the selection, the tray is automatically reserved for the user by a multi-function device The tray is reserved based on a user ID of the user. The user then loads one or more special media sheets in the reserved tray at the multi-function device. Before printing the document using the reserved tray, the multi-function device authenticates the user by checking his user ID. If the user ID matches, the multi-function device proceeds with printing the document using the special media sheets as loaded by the user in the reserved tray. This way, the methods and systems ensure that the user who reserves the tray for himself can print his content/document using the special media sheets/using the reserved tray without any intervention from other users. The methods and systems further restrict other users from printing their content/document (intended and/or unintended) on special media sheets loaded by the user in the reserved tray.

Exemplary Environment

FIG. 1 shows an exemplary environment 100 in which various embodiments of the disclosure can be practiced. The environment 100 includes a computing device 102 that includes a print driver application 104. The computing device 102 is used by a user for daily tasks such as email, chat, surfing, work, or other tasks. Various examples of the computing device 102 may be such as a laptop, a desktop, a mobile device, personal Digital Assistant (PDA) or the like. The computing device 102 is communicatively coupled to a multi-function device 110 via a network, discussed in FIG. 2. The multi-function device 110 performs one or more functionalities such as printing, scanning, copying, faxing, imaging or other functionalities. The print driver application 104 communicates with the multi-function device 110 in real-time and via a bi-directional communication channel established between the print driver application 104/computing device 102 and the multi-function device 110.

As shown, the multi-function device 110 includes one or more trays such as 112a 112b, 112c, and 112d (collectively 112). The trays 112 may support all media types. Alternatively, the trays 112 may support specific media types and/or media sizes. The trays 112 may include same media types and/or sizes or may include different media types and/or sizes. For example, the trays 112a and 112b may include A4 media type and the tray 112c may include A3 media type, and the tray 112d may include glossy media. In another example, the trays 112a, 112b, and 112c may include A4 media but of various sizes, and the tray 112d may include A3 media. In some implementations, any of the trays 112a, 112b, 112c, and 112d may be a dedicated tray in context of media sizes. For example, the tray 112b may support media size 216×279 mm but other trays such as 112a, 112c and 112d may support all media types and/or sizes. These are few examples, but other variations may be implemented without limiting or deviating from the scope of the disclosure.

In operation, the user submits a document for printing through his computing device 102. Specifically, the user accesses the print driver application 104 for submitting his document for printing. While submitting the document for printing, the print driver application 104 allows the user to submit one or more print attributes required for printing the document. Various examples of the print attributes may be such as quality, destination, output, orientation, color/black & white, a plurality of selectable multi-function devices for printing and so on. The user can select at least one multi-function device for printing his document. For example, it can be considered that the user selects the multi-function device such as 110 for printing. In context of the current disclosure, the print driver application 104 includes a special media option. The special media option allows the user to select a special media type such as letterheads, legal bonds papers, transparent sheets, glossy sheets, cardstock, glossy cardstock, or the like. Upon selection of the special media option, in context of the current disclosure, the print driver application 104 checks with the user if he wishes to reserve a tray for his special media printing. Based on the user confirmation, a list of one or more available trays is displayed to user for selection through the print driver application 104. Here, the list of trays available at the multi-function device 110 is displayed to the user. Once the user selects a tray, the print driver application 104 sends the required details such as the selected tray, the document and a user ID of the user to the multi-function device 110 for printing. The multi-function device 110 further proceeds with reserving the selected tray for the user based on the details as received from the print driver application 104, The user then loads one or more special media sheets in the selected tray at the multi-function device 110. Thereafter, the multi-function device 110 authenticates the user and prints the document of the user using the special media sheets present in the tray reserved for the user. Otherwise, the multi-function device 110 prints the document using other available trays at the device 110.

Specifically, before printing the document using the media sheets loaded in the reserved tray, the multi-function device 110 authenticates the user and this ensures that intended document/content/job gets printed on the special media sheets and further restricts printing the document of other users using the reserved tray till document of the user gets printed successfully. This reduces the chances of error in the media swapping or printing on wrong media. This way, the disclosure ensures that only user's content is printed on the special media sheets loaded by the user/or using the tray reserved for the user. More structural and implementation details of the disclosure will be discussed in FIG. 2.

The environment 100 is discussed with computing device 102 as an example, the disclosure can be implemented with other computing devices such as a mobile device or other equivalent device with print submission capabilities. Similarly, the environment 100 is shown to include a multi-function device such as 110 but the environment 100 can include any printing device such as a printer, a multi-function printer, or any device with printing capabilities The disclosure is discussed with respect to one multi-function device as an example, but the disclosure can be implemented for multiple multi-function devices. For example, the print driver application 104 displays a plurality of selectable multi-function devices and corresponding trays available at the multi-function devices. The user can select a particular multi-function device and a corresponding tray to be reserved based on his requirement/choice or the like.

Exemplary System

Figure 2:
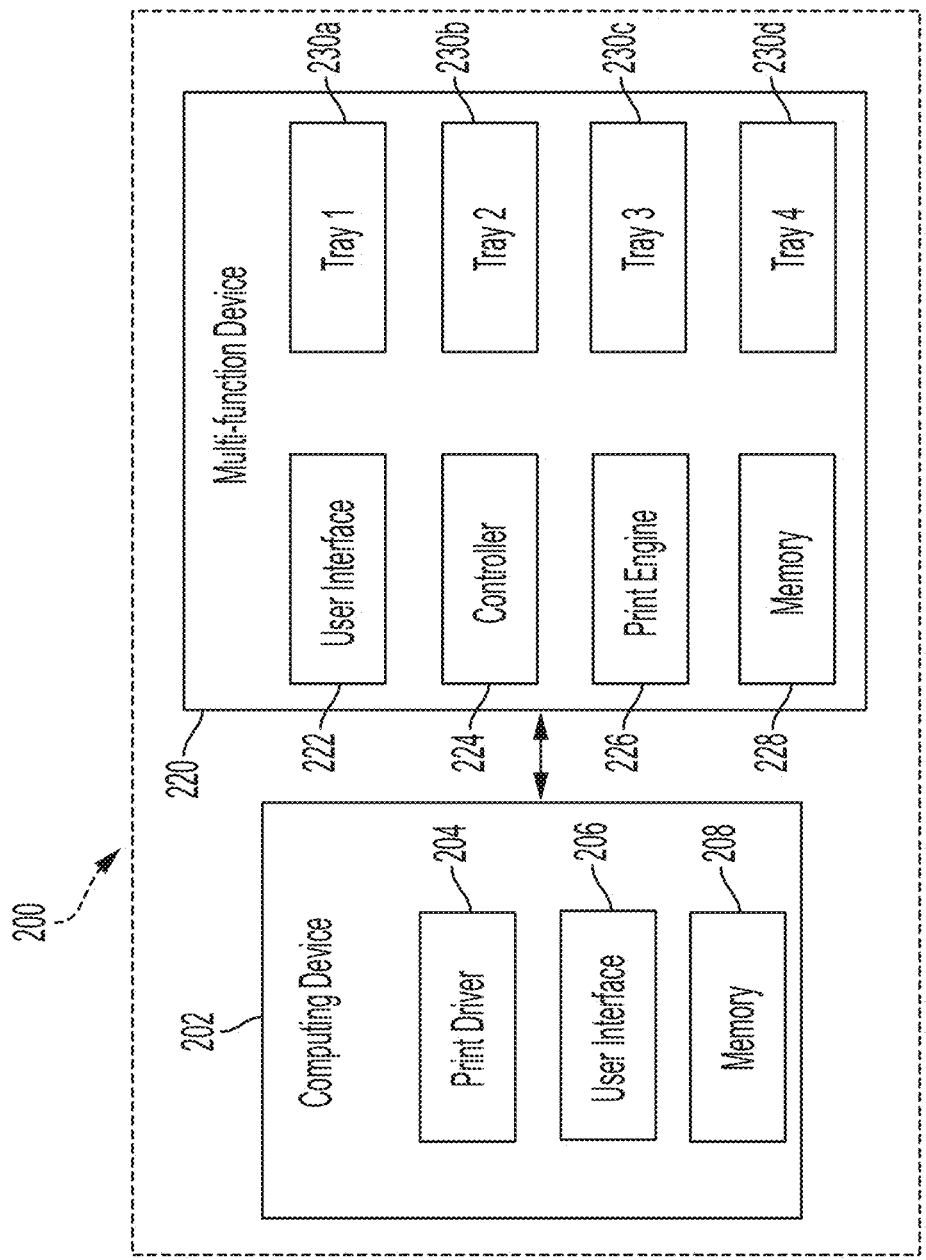
FIG. 2 is a block diagram illustrating various components of a system for reserving a tray fora user for special media printing, in accordance with an embodiment of the present disclosure.

FIG. 2 is a block diagram illustrating various components of a system 200 including a computing device 202 and a multi-function device 220 which is communicatively coupled to the computing device 202 via a communication network, although not shown. The communication network may be a wireless network, a wired network or a combination thereof. The communication network may be implemented as one of the different types of networks such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

As illustrated in FIG. 2, the computing device 202 includes a print driver application 204 (can be referred to as print driver), a user interface 206, and a memory 208. Each of the components 204-208 are connected to each to other via a conventional bus or a later developed protocol. The components 204-208 communicate and coordinate with each other to implement and perform the functionality of the present disclosure. As further shown, the multi-function device 220 includes a user interface 222, a controller 224, a print engine 226. a memory 228, and one or more trays such as 230a, 230b, 230c and 230d (collectively 230), The trays 230 may be referred to as input trays for inputting media sheets for printing or other imaging purpose. The multi-function device 220 may additionally include an output tray or an output area (although not shown) where all printed papers are output. The components 222-230 are connected to each other via a conventional bus or a later developed protocol and communicate with each other for performing various functions of the present disclosure. The multi-function device 220 may include additional component(s) as required to implement the present disclosure. Also, the multi-function device 220 may perform functions and operations like the multi-function device 110 as discussed in FIG. 1.

Each tray 230 may include various media sheets of various sizes and/or various colors. The trays 230 are loaded with media sheets by one or more users and/or admin user. The tray 230a may be referred to as tray 1 for A4 media sheets, the tray 230b as tray 2 for A3 media sheets, tray 230c as tray 3 for A4 media sheets again and tray 230d as tray 4 for special media sheets. Each tray 230 may support all media types and/or sizes. Any tray 230 may be a dedicated tray for special media printing or printing documents on special media sheets. Alternatively, the trays 230 may support special media printing even if the tray includes regular media sheets such as A4 sheets. For example, if the tray 230a includes A4 sheets but the tray 230a may support other media types such as letterhead, custom, legal bond, bond, glossy papers and so on.

At Computing Device Side

The implementation begins when a user wishes to submit a document for printing at the multi-function device such as 220. The document may include one or more pages and may be in any suitable format such as Portable Document Format (PDF), Microsoft DOC format, Hypertext Markup Language (HTML) format, Extensible Markup Language (XML) format, Microsoft XLS format (MS-XLS), Tag Image File Format (TIFF), etc. The document may include content in the form of image, text, graphics, or a combination thereof. In operation, the user selects a document to be printed and accesses the print driver application 204 running on his computing device 202. The print driver application 204 allows the user to submit one or more documents for printing to any connected device such as multi-function device 220. The print driver application 204 provides a user interface 206 to submit one or more print attributes as discussed above. At least one print attribute includes special media option.

Figure 3A:
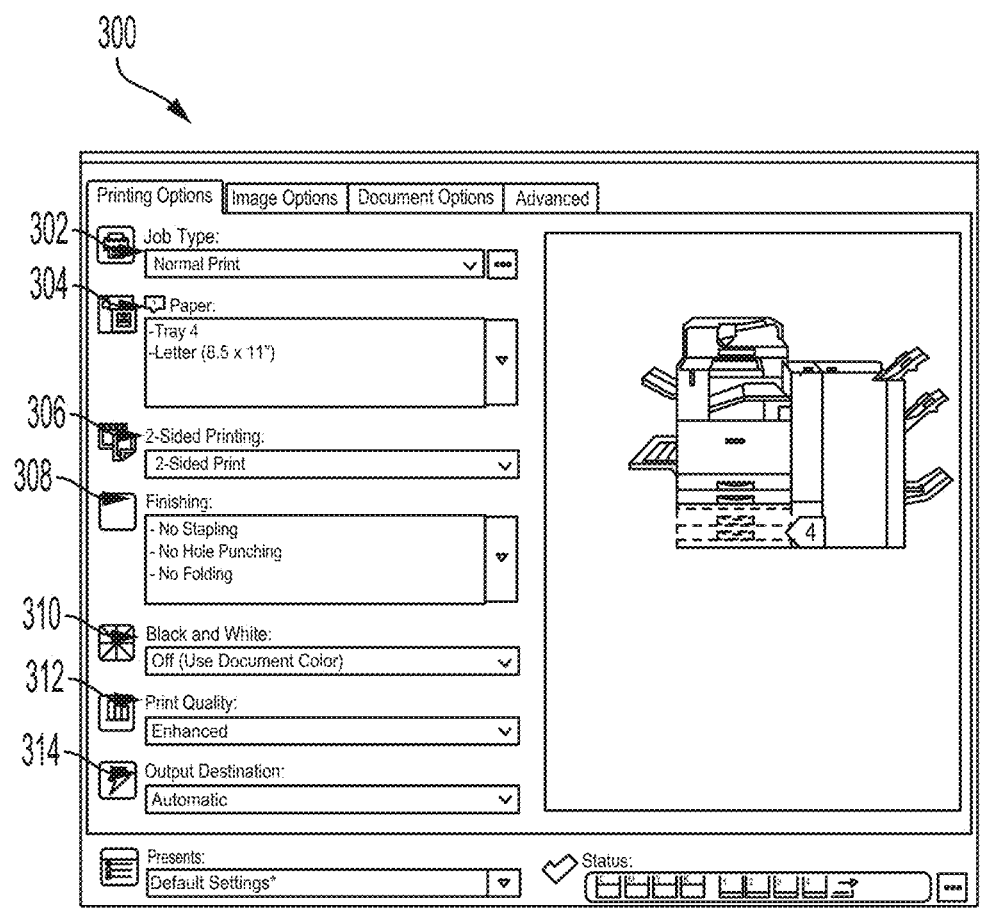
FIGS. 3A-3I are exemplary snapshots for implementing the current disclosure.
Figure 3B:
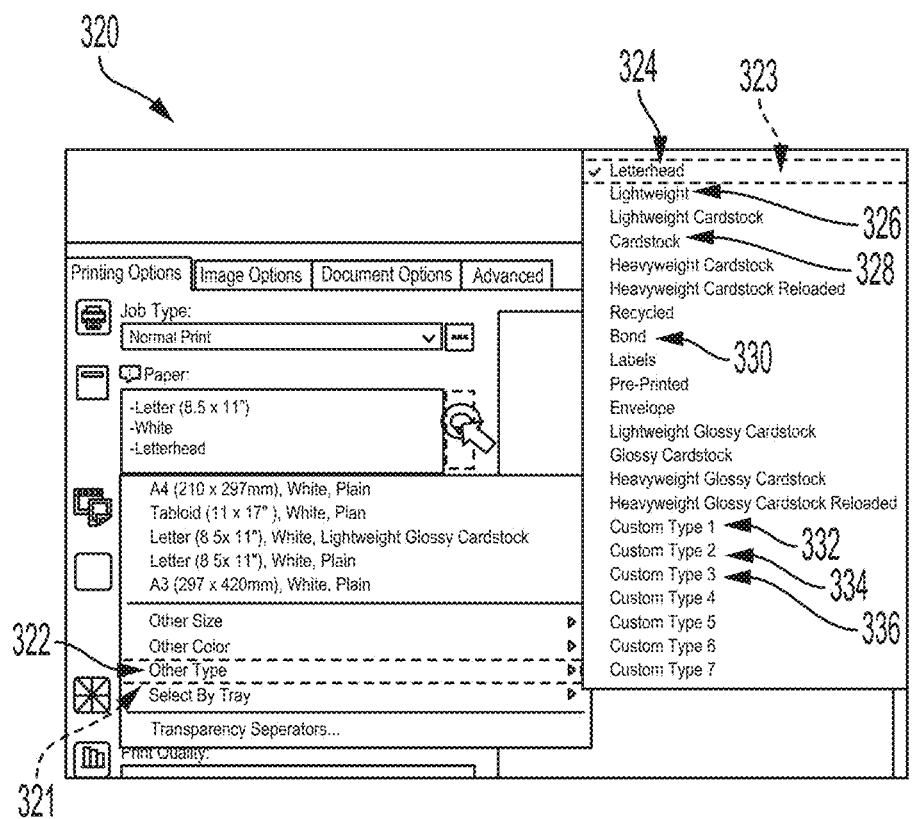

One exemplary snapshot 300 of a print driver application 204 is shown in FIG. 3A The print driver application 204 includes one or more print attributes such as job type 302, paper 304, 2-sided printing 306, finishing 308, black & white 310, print quality 312, output destination 314. The print driver application 204 also includes one or more selectable multi-function devices available for printing. For easy discussion, the print driver application 204 shows one multi-function device such as 220 for printing without limiting its scope. As further shown in the snapshot 320 of FIG. 3B, the user selects special media type such as other type (marked as 322), the selection shown via 321 The option other type, marked as 322 further includes different special media such as letterhead 324, lightweight 326, cardstock 328, bond 330, custom type 1 332, custom type 2 334, custom type 3 336 and so on. Here, the user selects special media such as letter head, marked as 324, wherein the election is shown via 323.

Figure 3C:
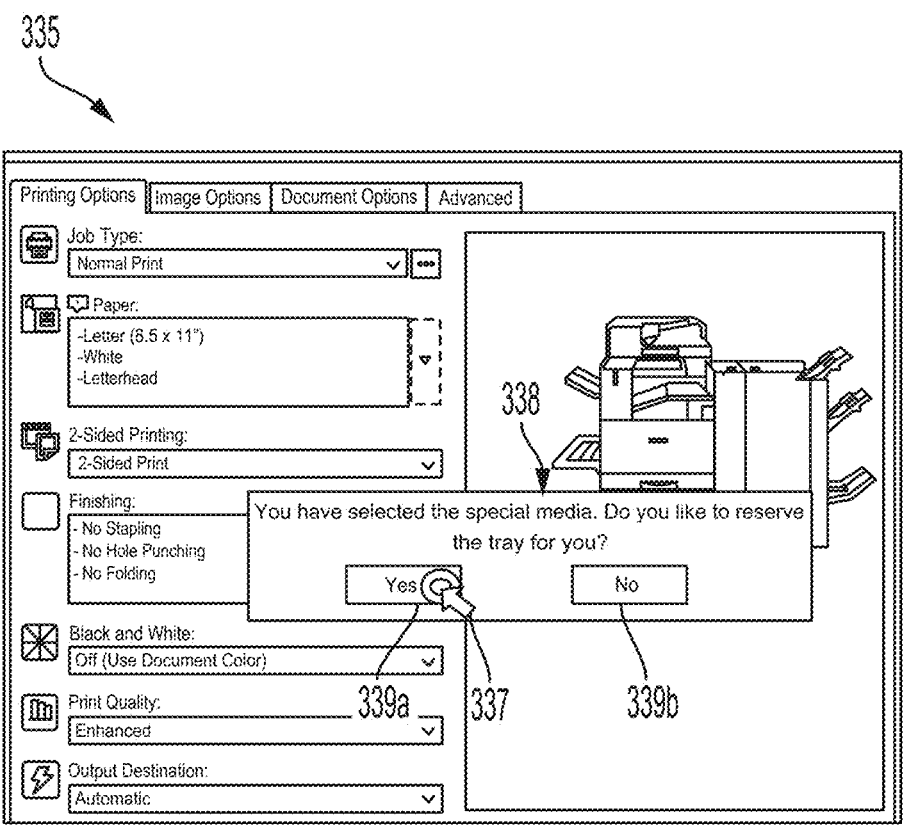

In context of the present disclosure, the user selects a special media option through the user interface 206. Upon selection of the special media option and further special media type such as letter head, the print driver application 204 checks with the user if the user wishes to reserve a tray for printing his document on the selected special media. To this end, a prompt is displayed to the user through the user interface 206. One exemplary snapshot 335 of a pop-up message 338 displayed to the user through the user interface 206 is shown in FIG. 3C. According to the snapshot 335, the message 338 is—"You have selected the special media. Do you like to reserve the tray for you?" The pop-up message 338 further includes two options yes (marked as 339a) and No (marked as 339b). If the user selects the yes option 339a, the print driver application 204 proceeds further. If the user selects the No option 339b, the print driver application 204 proceeds with conventional ways. In context of the current disclosure, the user selects yes option 339a wherein the selection is shown via 337.

Figure 3D:
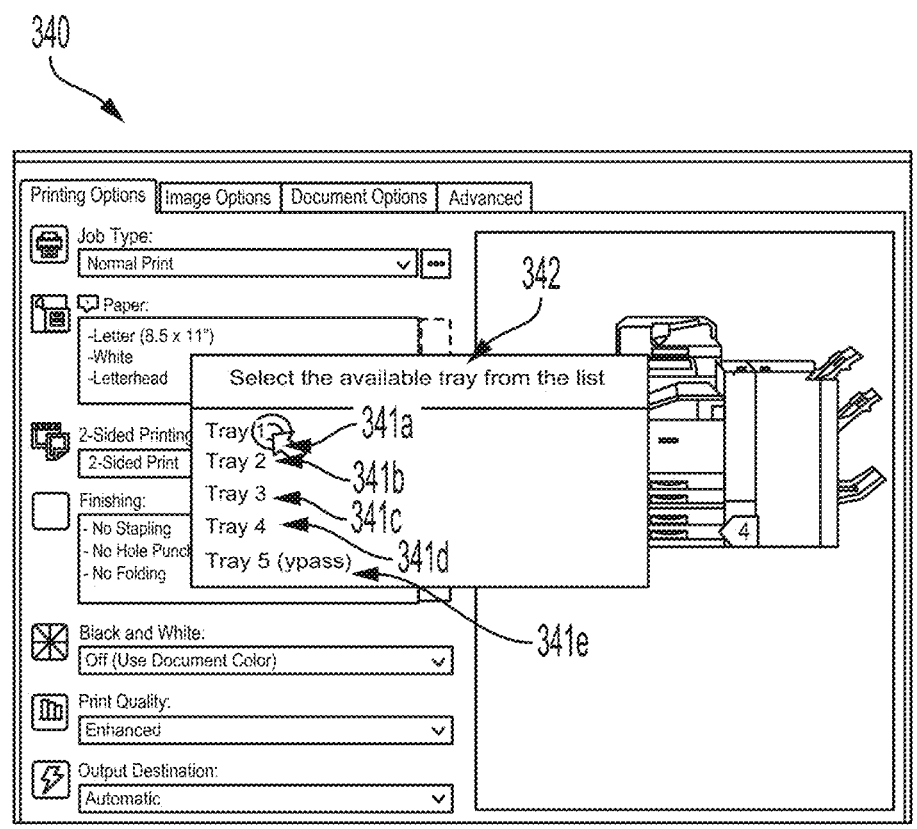

Based on the user selection, the print driver application 204 further establishes a bi-directional communication channel with the multi-function device 220, Once established, the print driver application 204 requests the multi-function device 220 for a list of one or more available trays i.e., the list of trays available at the multi-function device 220 for reservation. The multi-function device 220 checks status of each tray 230 and retrieve the list of available trays and sends the list of available trays to the print driver application 204, This way, the print driver application 204 obtains the list of available trays at the multi-function device 220. Once received, the print driver application 204 displays the list of available trays to the user for selection. Specifically, the user interface 206 of the print driver application 204 displays the list of available trays to the user. An exemplary list of trays 342 as obtained from the multi-function device 220 is shown in the snapshot 340 of FIG. 3D. As clearly seen, the list 342 includes 5 available trays shown as tray 1 (marked as 341a), tray 2 (marked as 341b), tray 3 (marked as 341c), tray 4 (marked as 341d) and tray 5 (marked as 341e, also referred to as bypass tray). The user can select a tray for reservation for printing his document. The print driver application 204 receives the user selection of a tray such as tray 1, marked as 341a. Post selection of the tray for reservation, the print driver application 204 retrieves a user ID of the user from the memory 208. Various examples of the user ID may be employee ID, employee name, employee code, username, a unique code, an organization code, or a combination thereof. The memory 208 stores the document of the user, user details such as username, password, user ID and so on. The user ID can be of any length or may have alphabets, numbers, special characters, or a combination thereof. Alternatively, the print driver application 204 retrieves the user ID of the user based on login credentials of the user. In further example, the print driver application 204 can obtain the user ID directly from the user. This way, the print driver application 204 obtains the user ID. Thereafter, the print driver application 204 sends the document, the user ID, the selected tray such as 341a, and the print attributes to the multi-function device 220 for further processing. These details are sent to the multi-function device 220 in a pre-defined format as known or later developed formats.

At Multi-Function Device Side

The multi-function device 220 receives the details such as the document, the user ID, the selected tray ID such as tray 1 (marked as 341a), and the print attributes from the computing device 202. The multi-function device 220 further stores the received details in the memory 228 of the multi-function device 220, The controller 224 further adds the received document for printing in a job queue at the multi-function device 220. Then, the controller 224 performs a mapping between the user ID, and the tray ID for later retrieval, use and/or access. The mapping helps identify which tray is reserved for a particular user. In some implementations, the controller 224 performs a mapping between the user ID, tray ID and the media type. The controller 224 further stores the mapping of the user ID, the tray ID, and the media type for later retrieval. Once mapping is performed, the controller 224 automatically reserves the tray for the user using the user ID and the tray ID for special media printing by the user. While reserving, the controller 224 changes the status of the selected tray (such as 230a, or 341a) from "available" to "reserved". This way, the tray is reserved for the user. The tray is reserved for the user for, a pre-defined time or till the document of the user is printed successfully by the user. Alternatively, the tray is reserved for the user till the user takes out loaded special media sheets from the reserved tray.

The controller 224 reserves the tray for the user such that no other user can print their documents/content using the reserved tray. In other words, the tray 230a is not available for any other users for special media printing for the pre-defined time. Once the tray 230a is reserved for the user, other users can neither reserve the tray 230a nor use the media sheets loaded in the tray 230a. Once reserved, the controller 224 may change the status of the tray 230a to "reserved" for easy identification while printing and may keep status of other trays as "available". Here, the tray 230a is a reserved tray and trays 230b, 230c and 230d are referred to as available trays. The controller 224 may additionally display a message via the user interface 222 to the user confirming that the tray 230a i.e., tray 1 is reserved for the user. The message can be displayed to the user via the user interface 206 of the print driver application 204.

As discussed above, the tray 230a can be reserved for the given user based on the user ID until he completes printing his documents using the reserved tray The tray 230a can be reserved until special media is taken out from the tray. The tray 230a can be reserved for the pre-defined time such as 10 mins, 15 mins and so on. The pre-defined time can be set by an admin user or can be pre-set at the multi-function device 220. These are few examples for the tray reservation but other variations to these may be implemented. The tray is reserved based on the tray ID and the user ID.

Later, for printing his document using the reserved tray 230a, the user loads one or more special media sheets in the selected/reserved tray such as tray 230a or tray 1.

In one example, the user may load one or more letterheads in the tray 230a of the multi-function device 220. For loading, the user opens the tray 230a, puts the letter heads in the tray 230a and closes the tray 230a. Upon closing the tray 230a, the controller 224 automatically identifies the tray accessed by the user and automatically identifies a tray ID of the tray such as 230a accessed by the user. In this case, the tray ID for the tray 230a is tray 1. The user may load any number of media sheets based on his choice and/or requirement of the user. For example the user may load 1 letterhead in the tray 1, 2 letterheads, 5 letterheads and so on.

In some implementations, the user is presented with the user interface 222 to input or select loaded media details such as media type, media size and media color. The user can select the media type corresponding to media sheets he loads in the tray 230a (or tray 1). For example, if the user loads the letterhead in the tray 1, the user selects the letterhead. If the user loads the bond, the user selects the bond media sheet. One such exemplary user interface displaying media details such as such as media size (351a), media type (351b), and color (351c) for user's selection is shown in the snapshot 350 of FIG. 3E. As shown, the user selects the option media type 351b (selection shown via 353) through the user interface 350. Upon selection of the option 351b, the interface 350 lists all media types that the multi-function device 220 or trays 230 at the multi-function device 220 support for printing Few examples of the media at the multi-function device 220, are shown in snapshot 360 of FIG. 3F. The snapshot 360 includes new paper type 4 (marked as 361a), plain (marked as 361b), letterhead (361c), heavyweight cardstock (361d), bond (361e), new paper type 3 (361f, pre-printed (361g) and so on. The user then selects a media type such as letterhead 361c (selection marked as 363) from the listed media as shown in the, user interface 360 of FIG. 3F. Once selected, another user interface 370 is shown in FIG. 3G. The interface 370 shows media details (marked as 373) such as media type (letterhead), color (white), and size (A4 210×297 mm) for user confirmation. The user can select the option 371 to provide his confirmation that the media details 373 are correct.

Figure 3E:
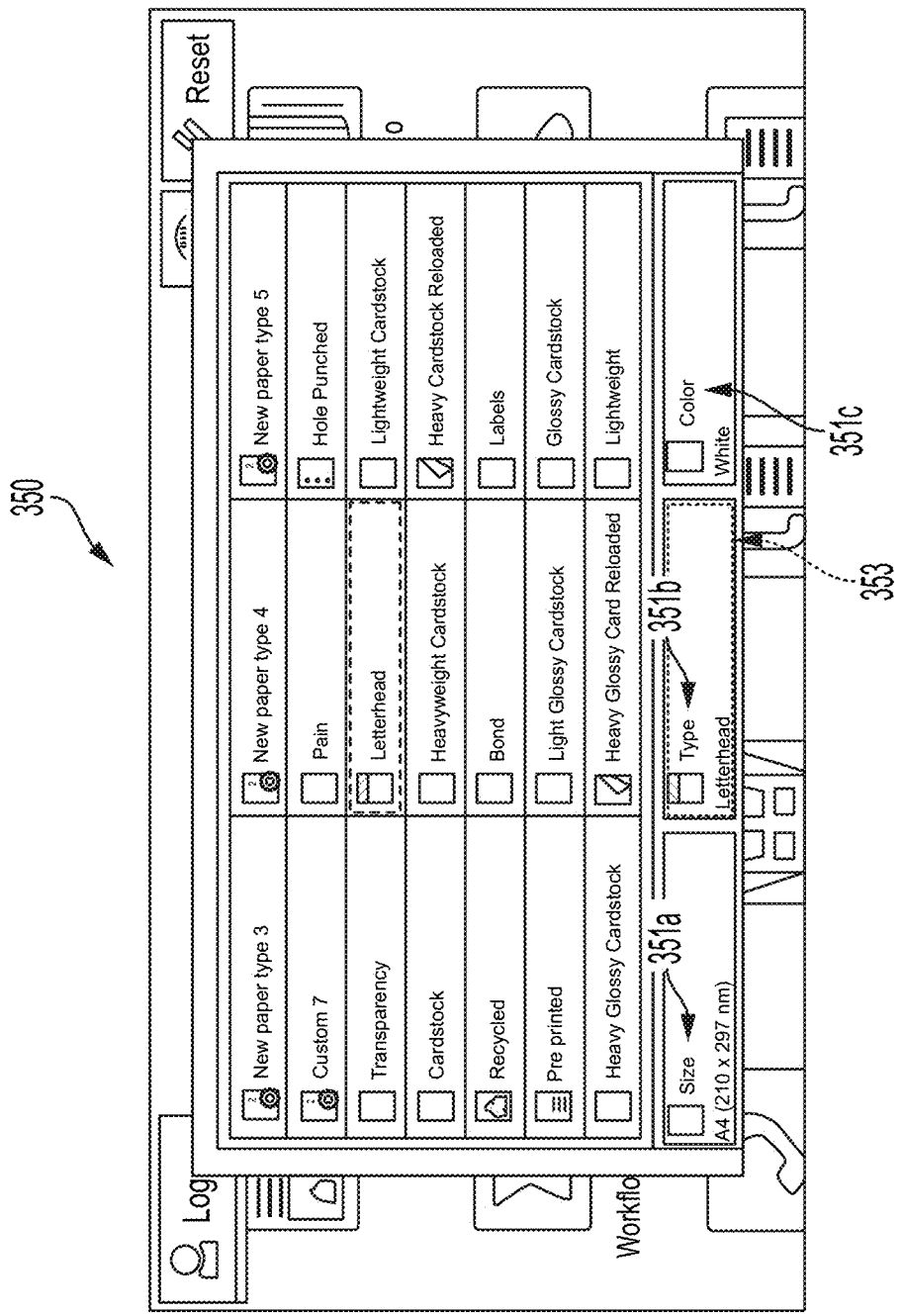
Figure 3F:
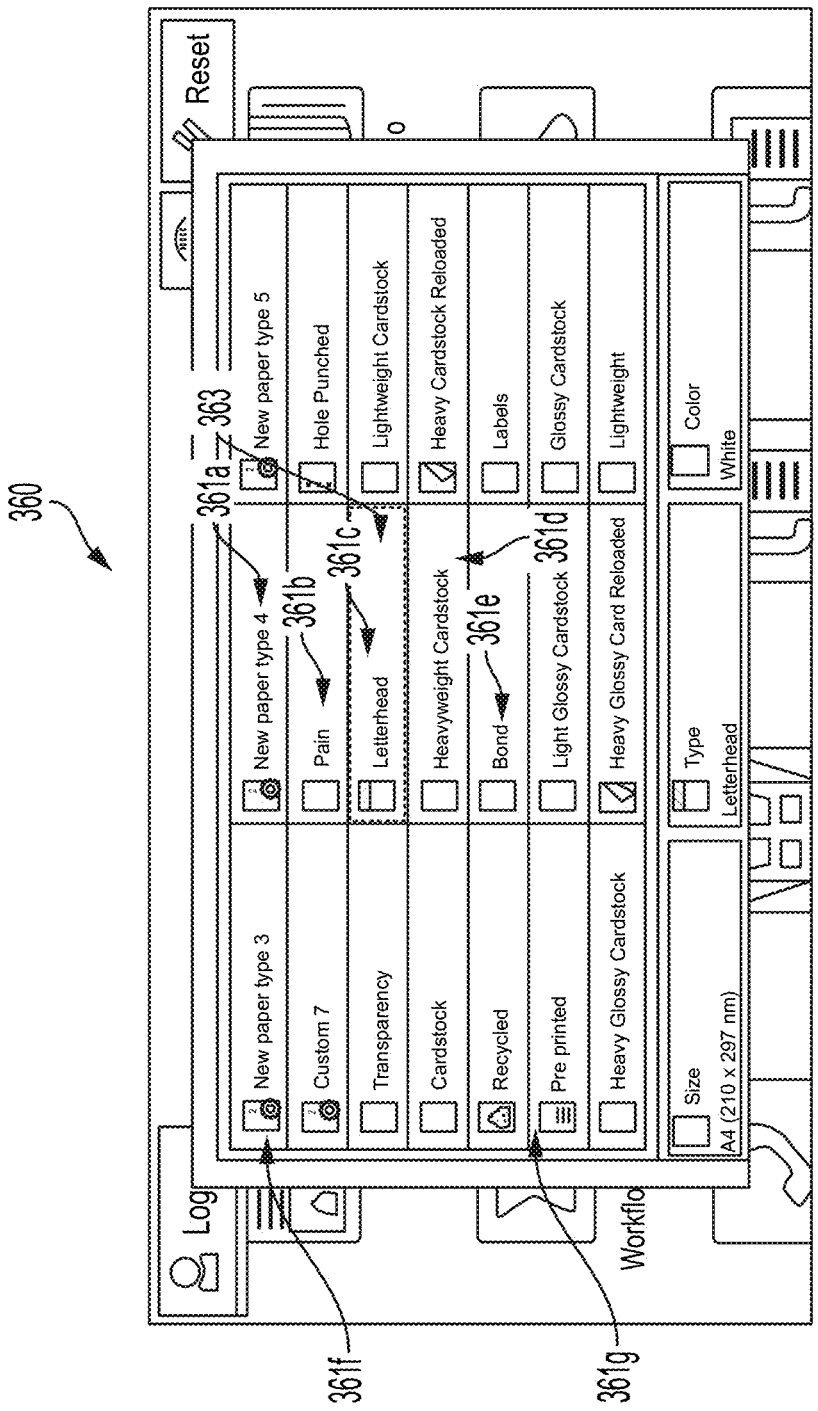
Figure 3G:
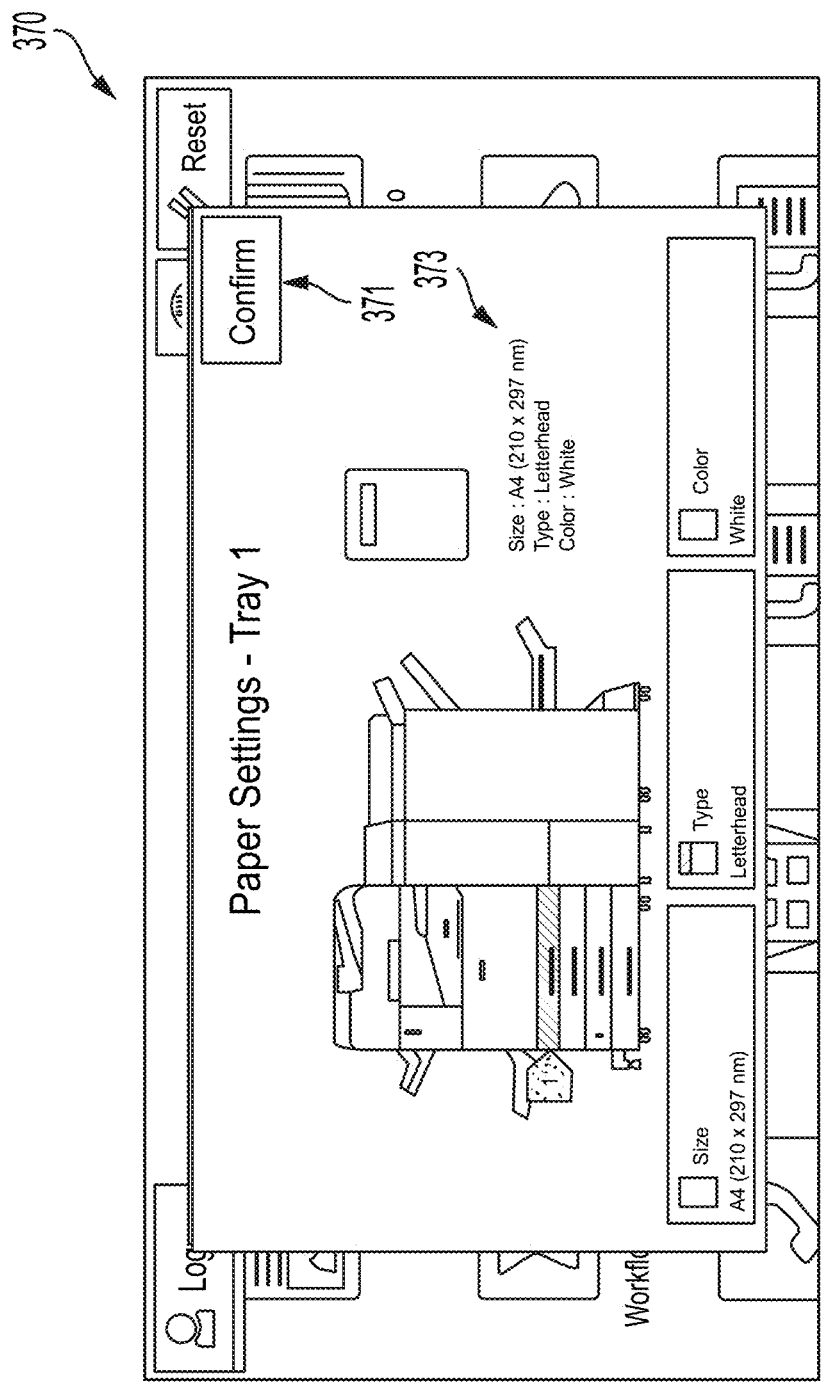

The selection of media type is just one example; the user can select media size 351a as an option as shown in the interface 350 of FIG. 3E. This way, the loaded media details are provided or input by the user through the user interface 222

Figure 3H:
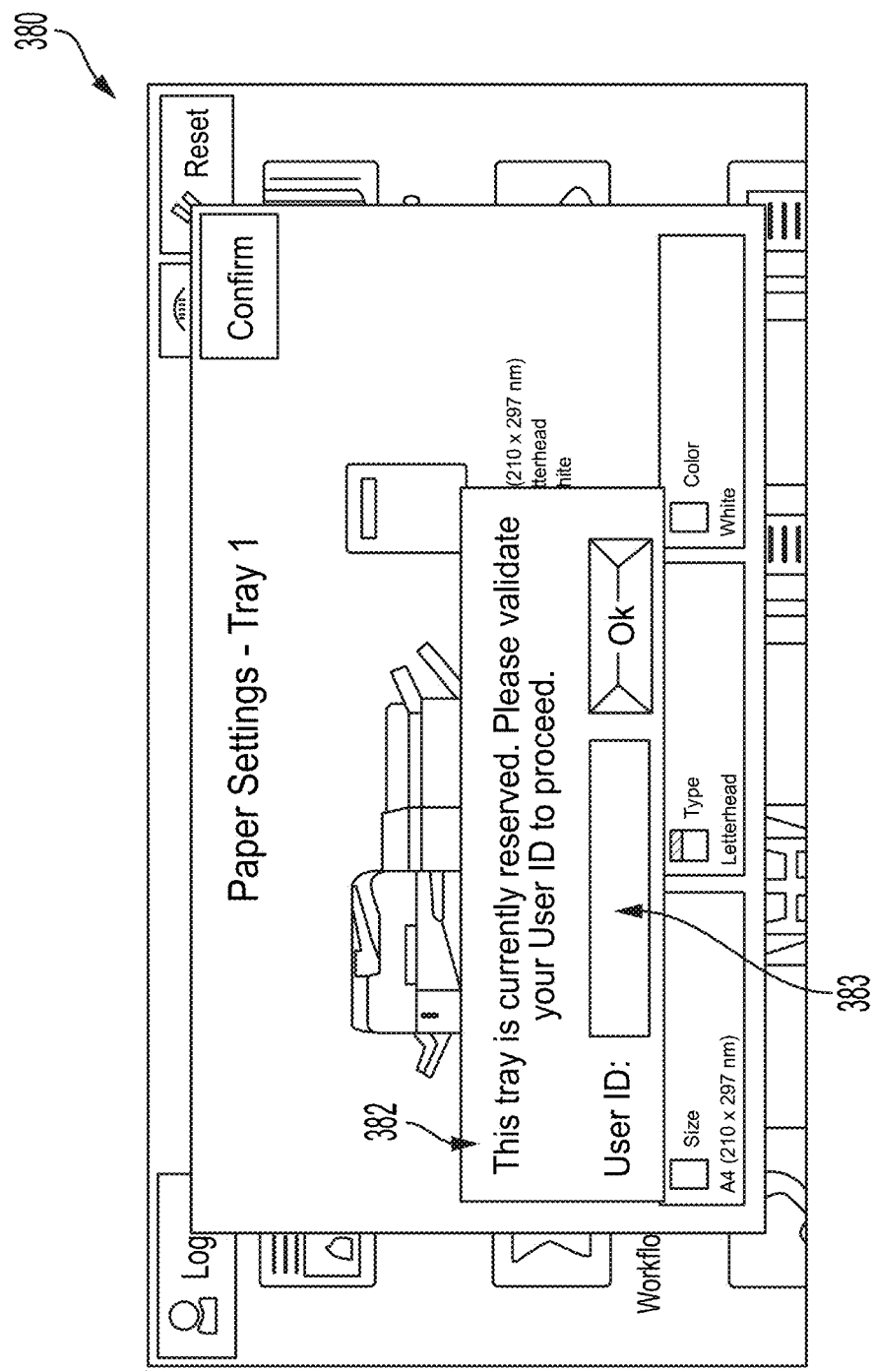
Figure 3I:
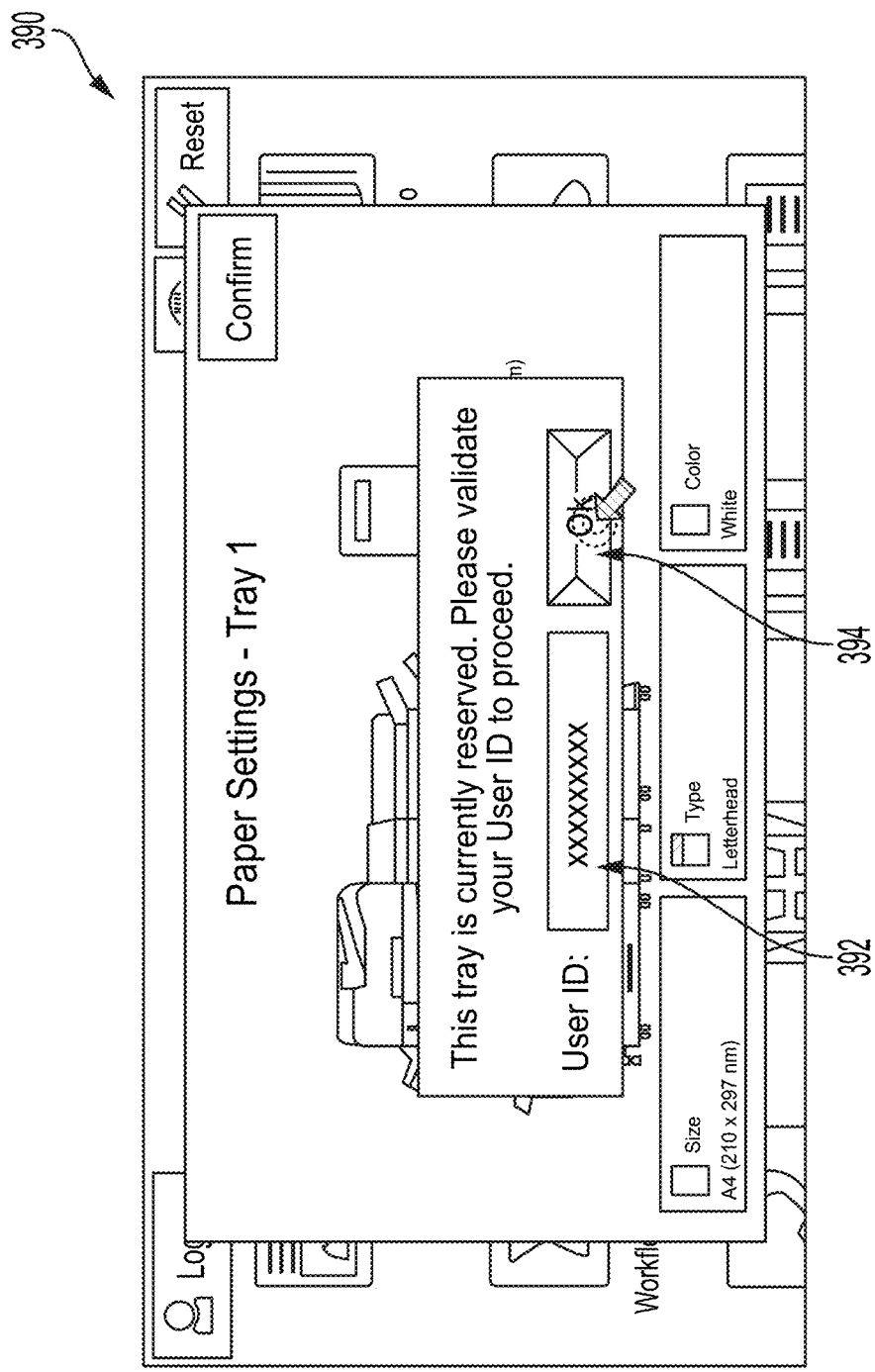

The controller 224 then checks the status of the tray 230a accessed by the user. If the status is "reserved", then the controller 224 displays a message to the user through the user interface 222 indicating the tray 230a is reserved and the controller 224 further performs an authentication. One exemplary message 382 is shown in the snapshot 380 of the user interface 222 of FIG. 3H. The message 382 indicates that the tray is reserved and further asks the user to authenticate himself. Exemplary message 382 is "This tray is currently reserved. Please validate your User ID to proceed". The user interface 222 includes a text box 383, as shown to input a user ID. The user can provide his user ID in the text box 383 as further shown in the snapshot 390 of FIG. 3I. The user provides his user ID (marked as 392) and further selects the option OK (marked as 394). The controller 224 receives the user ID as input by the user through the user interface 222. Then, the controller 224 matches the received user ID with the user ID stored in the mapping or in the memory 228 of the multi-function device 220. If the user ID matches, the controller 224 recognizes that the user who loads the special media sheets at the multi-function device 220 is the same user who reserved the tray for special media printing. The controller 224 instructs the print engine 226 to use the reserved tray 230a for printing the document received from the user. The print engine 226 picks special media sheets loaded in the reserved tray 230a, by the user to print his document and successfully completes printing the document of the user. This way, the document of the user is printed using the reserved tray 230a.

If the user ID does not match, the controller 224 recognizes that the user who loads media sheets in the tray 230a is a different user (i.e., the user who reserved the tray for special media printing is different from the user who loads special media sheets in the reserved tray 230a at the multi-function device 220). The controller 224 does not accept the media loaded by the user and requests this user to take out the loaded media as the tray 230a is reserved for some other user. The controller 224 further instructs the print engine 226 to print the received document using available trays such as 230b, 230c, and 230d, Alternatively, the controller 224 may instruct the print engine 226 to print the document of this user after the tray 230a is available. The authentication at the multi-function device 220 ensures the reserved tray is used for the intended user or printing content of the intended user i.e., the user who reserved the tray.

Post print completion, the controller 224 checks with the user if the reserved tray 230a can be revoked. The user can provide his input through the user interface 222. Alternatively, the controller 224 automatically revokes the tray reservation such that the tray 203a can be made available for other users. Post this, the controller 224 may change the status of the tray 230a from "reserved" to "available". Subsequently, the tray 230a is made available for all users for any media printing including special media printing. Upon successful completion, the tray 230a is rollback to previous state i.e., "not reserved", or "available" by removing all restrictions as set part of the tray and user ID mapping, In some examples, the controller 224 may prompt the user via the user interface 222 of the, multi-function device 220 to extend the pre-defined time of the tray reservation. If the user does not provide any response, the controller 224 revokes the reservation of the tray 230a after the pre-defined time is lapsed. The pre-defined time may be extended when the user wishes to print more documents using the special media as loaded by him. In such cases, the user may choose an option "Remind me later" as displayed to him via the user interface 222 of the multi-function device 220. As a result, the pre-defined time for the tray reservation is extended for the user. For example, if initially the tray is reserved for 15 minutes, the extended time may be additional 10 minutes. So overall, the total time of the tray reservation for the user is 25 minutes.

In some examples, the controller 224 may revoke the tray reservation based on users input. For example, when the user goes to collect his printed document, a prompt is shown to the user seeking his confirmation on whether the tray reservation can be revoked. Based on the user confirmation, the tray 230e is made available for all users. The status of the tray 230a may then be changed from "reserved" to "available".

If the user does not confirm for revoking the tray reservation, a user interface is shown to the user asking if he wishes to print more than one document using the special media sheets. Then, the controller 224 displays a remind me later option to the user through the user interface 222. The reminder can be set for a pre-defined time such as 15 mins. The user can select that option. Based on the selection of the reminder option, a prompt is shown to the user after a regular interval such as 5 mins, 10 mins, and 15 mins, if the user does not respond to the reminder within 15 mins, the controller 224 may revoke the tray reservation automatically. This way, the tray reservation can be revoked automatically or based on input from the user. These are few examples, but the tray reservation can be revoked in other scenarios as well.

The user interface 222 further allows the user to input various details such as media details, user ID and other relevant details required for implementing the present disclosure. For example, the user interface 222 allows the user to perform various selection in context of the current disclosure such as media type, media type, media color, and so on. The user interface 222 further displays various message/notification to the user as relevant for implementing the current disclosure.

The memory 225 stores all relevant information required for implementing the, current disclosure. For example, the memory 228 temporarily stores the tray ID of the reserved tray 230a along with the user ID and media type. Specifically, the memory 228 stores a mapping between the user ID, tray ID and the media type for later retrieval, use, and/or access by the controller 224 or the multi-function device 220. The memory 228 further stores all trays' ID and corresponding media details available in the trays 230. Any details stored in the memory 228 may be retrieved by the controller 224 as and when required for implementing the current disclosure. These are few examples, but the memory 228 may store other relevant details/information required for implementing the current disclosure.

Although the disclosure is discussed with respect to scenarios where the user sends a document for printing from his computing device. But the disclosure, can be implemented where the user can directly select a document for printing from the memory 223 of the multi-function device 220 or from a cloud location accessible via the multi-function device 220 or other known ways or later developed methods. These are few examples but other variations to these may be implemented.

Additionally, the disclosure is discussed with respect to a single document for special media printing, but the user can send more than one document for special media printing, without deviating from the scope of the disclosure.

The components 222-230 as discussed above are exemplary in nature. But the multi-function device 220 may include more or lesser number of components. For example, the functionality of the controller 224 may be directly incorporated in the multi-function device 220. As a result, the multi-function device 220 implements the functionality of the tray reservation authentication before printing, tray revoking, or the like.

Exemplary Flowcharts

Figure 4:
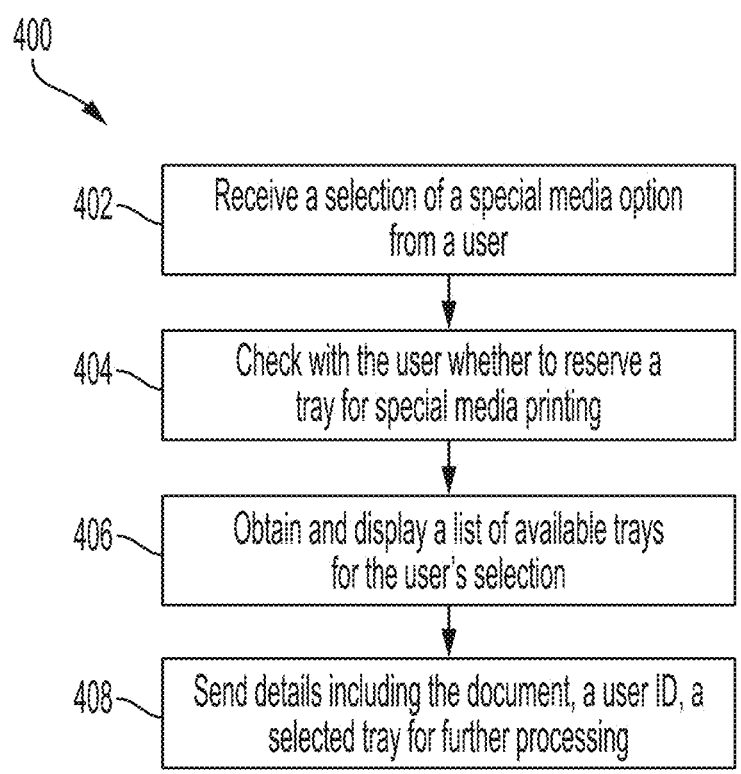
FIG. 4 is n exemplary method flowchart for tray reservation for a user for special media printing.

FIG. 4 is a method flowchart 400 for alloying a user to reserve a tray for special media printing while submitting a document for printing. The method 400 may be implemented at computing device, specifically at a print driver side.

Initially, a user selects a document for printing through a print driver application running on his computing device such as 102. The document includes content in the form of image, text, graphics, or a combination thereof. The document can be in any desired format such as MS word, PDF, or the like. The document may have one or more pages. Upon accessing the print driver application, a user interface is shown to the user including one or more print attributes. The user submits print attributes for printing his document. In context of the current disclosure, the user selects a special media option for printing. The selection of the special media option is received at 402.

Figure 5A:
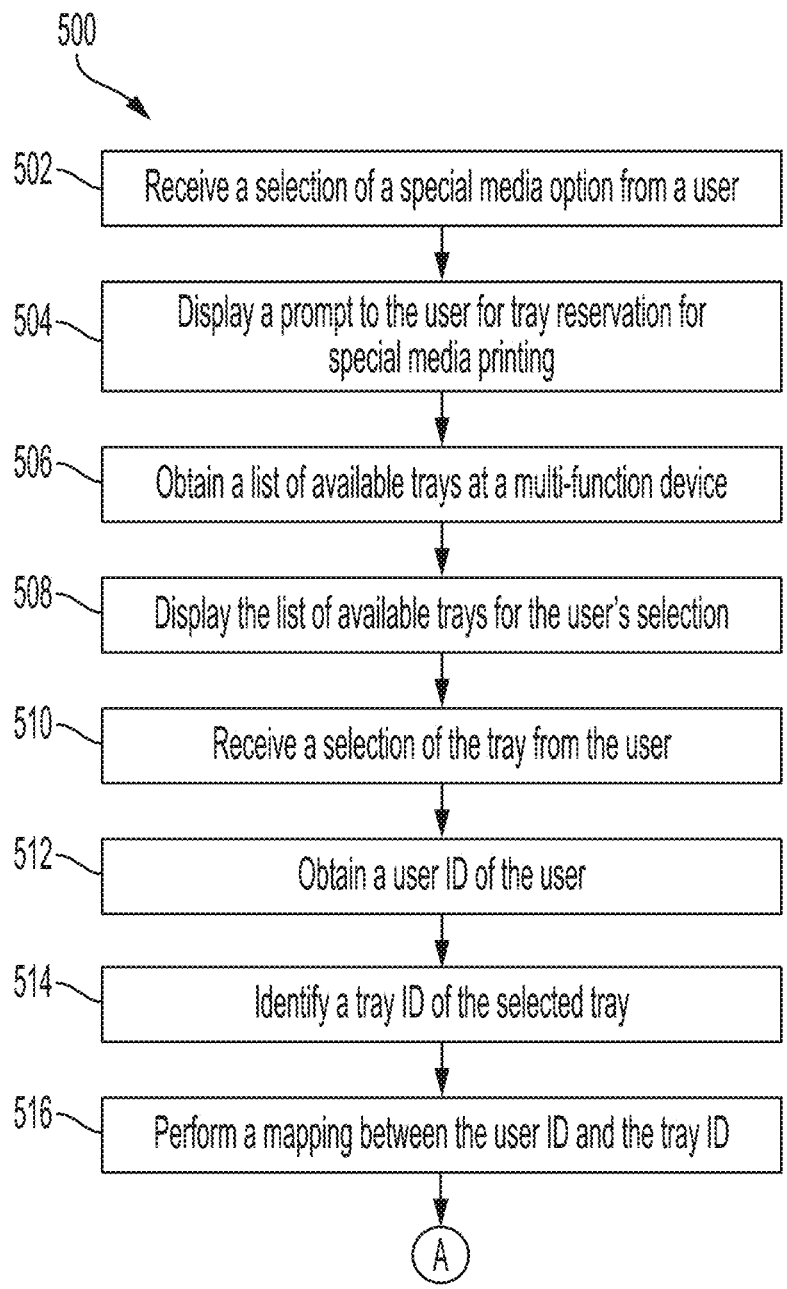
FIGS. 5A-5B represent a complete method flowchart for reserving a tray for a user and printing his document using the reserved tray.
Figure 5B:
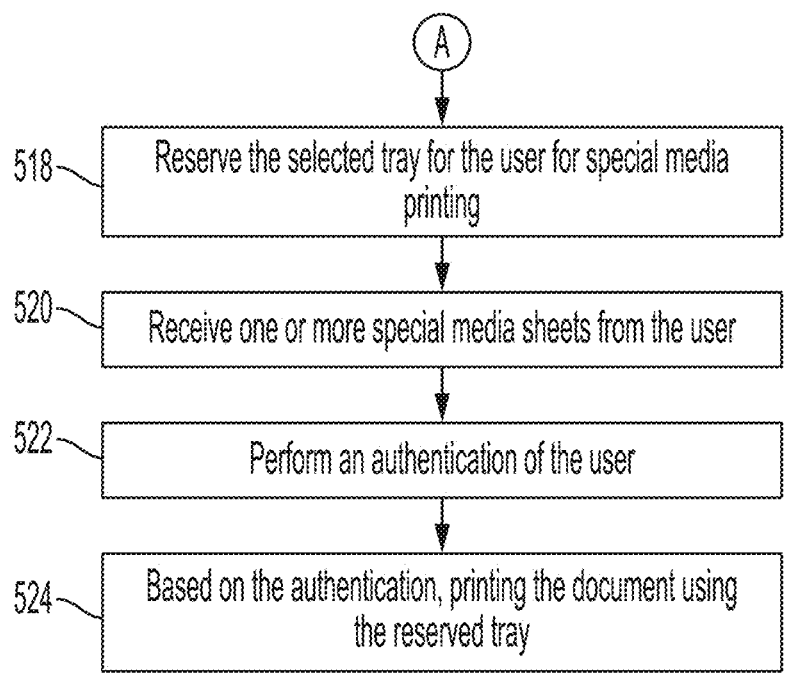

Upon selection of the special media option, it is checked whether the user wishes to reserve a tray for special media printing at 404, If the user'confirms to reserve the tray, a list of one or more trays available with a printing device such as a printer or a multi-function device 110, 220 are obtained, at 406. Here, at 406, the obtained list of trays is displayed to the user for selection. The user, here selects any of the displayed tray for printing. The user details such as user ID are automatically retrieved from the login credentials of the user. Post selection of the tray by the user, at 408, the document, the selection of the special media option, the selection of the tray, the user ID and the print attributes are sent for further processing. The details as discussed here are sent to the multi-function device 110. The tray is reserved for the user using the user ID and the tray ID. Based on the received details, the selected tray is reserved for the user. The tray is reserved for a pre-defined time such as 5 mins, 10 mins, 15 mins and so on. The tray'can be reserved till the document of the user is successfully printed using the selected/reserved tray. The tray can be reserved till loaded special media sheets are taken out from the selected/reserved tray. This method 400 allows the user to reserve the tray for himself for special media printing while submitting the document from his computing device/print driver application. The tray is reserved such that no other user can print his document using the reserved tray. Before printing any document using the reserved tray, an authentication is performed at the multi-function device. More details will be discussed below in conjunction with FIGS. 5A-5B FIGS. 5A-5B represent a detailed method flowchart 500 for reserving a tray for a particular user for special media printing and printing his document. Some blocks of the method 500 may be implemented at a computing device, specifically, at a print driver of the computing device such as 102 of FIG. 1, or the computing device 202 of FIG. 2 while some blocks can be implemented at a multi-function device 110 of FIG. 1 or 220 of FIG. 2.

At Print Driver Side

The method 500 begins when a user wishes to print a document on special media such as legal bond paper. The user opens a print driver application on his computing device to submit his print request. Upon opening, the print driver application provides a user interface to submit one or more print attributes for printing the document. Few examples of the print attributes can be quality, orientation, destination, black & white/color, single-sided/double-sided, media type, media type, output destination, quality, color, 2-sided print, page range, orientation etc. and so on. The user can select the print attributes for printing his document. In context of the current disclosure, the user selects special media printing option. The special media selection is received at the print driver application, at 502. Upon receiving, a notification is displayed to the user if the user wishes to reserve a tray for special media printing at 504. If the user selects yes, the method 500 proceeds further, otherwise, the method 500 proceeds with conventional ways. In context of the current disclosure, the user selects Yes to reserve the tray for special media printing.

In some examples, a user interface is provided to the user to select media details such as media type, media size and media color. Various examples of the media type may be letterhead, legal bond paper, pre-printed papers, glossy papers, light glossy cardstock, cardstock paper, envelopes, transparencies, custom media, and labels, and so on. Various examples of the media sizes may be 76.2 mm×127.0, 210 mm×297 mm, 215.9×355.6 mm, 15×280 mm and so on. Similarly, various examples of the media color may be black, white, or any other color. For example, letterhead media type may have a size of 215.9×279.4 mm, tabloid as 279.4×431.8 mm, legal as 215.9×355.6 mm, executive as 184.15×266.7 mm, B4 media type as 257×364 mm and so on. The user interface displays a list of one or more media types to the user, the user can select his desired special media type such as letterhead from the list. The user can similarly provide other media details such as media size and the media color through the user interface of the print driver application.

Upon confirmation/input from the user, the print driver interacts with the multi-function device in real-time to obtain a list of one or more available trays, at 506. The available trays refer to any trays which are not already reserved by other users for printing. At 508, the list as obtained from the multi-function device is displayed to the user in real-time. The user then selects any of the displayed tray for his special media printing. Once the user selects a tray, the tray selection is received by the print driver application, at 510 The tray may be any tray in the multi-function device that can be used for special media printing. In one example, the tray may be a dedicated tray which is typically used by the multi-function device for special media printing. Otherwise, the tray can be any other tray of the multi-function device.

Then at 512, a user ID of the user is obtained. For example, the user ID can be obtained from login credentials of the user. In another example, the user ID can be obtained from his email account. In further example, the user ID can be obtained directly from the user. Various examples of the user ID can be employee ID, username, email address, employee code, organization code, employee name or a combination thereof. Thereafter, the document, the print attributes, special media selection option, user ID and the selected tray are sent to the multi-function device for further processing.

At Multi-function Device Side

The details including the document, the print attributes, special media selection option, the user ID and the selected tray are received. Upon receiving the details from the print driver/computing device, the details are analyzed. Once received, the document is added in a job queue at the multi-function device. Based on the tray selected by the user, the tray ID of the selected tray is identified at 514. Thereafter, a mapping is performed between the user ID, and the tray ID at 516. The mapping is stored for later retrieval. Then, the print job is held for resources. At 518, the tray is reserved for the user for special media printing. The tray is reserved for the user such as user A such that content received from other user such as user B is not printed using the reserved tray. Rather, other available trays may be used for printing the documents received from other users such as user B.

Later, user loads one or more special media sheets in the selected tray, tray 1, for example. At 520, the one or more special media sheets loaded In the reserved tray are received. Here, a tray ID of the tray is automatically identified/detected based on the loaded media sheets by the user. The tray is identified based on the tray ID accessed by the, user at the multi-function device. Upon closing the tray, a notification is displayed to the user. The notification indicates that the tray is reserved. At 522, an authentication is performed where the user who loads the special media sheets, is required to input his credentials such as user ID. Here, the authentication is required to verify that the user who loaded the media sheets is the user who the tray is reserved for. The user inputs his user ID. Then, the user ID input by the user ID is matched against the user ID stored in the mapping. If the user ID is matched, then the user is asked to submit media type, The user here selects/inputs letter head as media type. In some implementations, the method 500 includes media type confirmation. Here, the user inputs media details such as media type-letter head, media size 8.5 mm×1 mm. At 524, the user document is printed using the special media sheets as loaded in the reserved tray. This way, the user's document is printed successfully without any hassle.

If the user authentication or the media details confirmation fails, the user is notified to use other available trays. Here, no media is accepted in the reserved tray. Subsequently, the user is required to input media in a different tray and proceed with his job. In this case, the document of this user is printed using other available trays at the multi-function device, Upon successful printing, a prompt is shown to the user to confirm if the tray reservation can be revoked. If the user confirms, the tray is revoked automatically and is made available for use by other users. If the user doesn't provide his confirmation to the displayed prompt, within a pre-defined time, say 15 mins, the tray is revoked automatically by the multi-function device.

In some implementations, the tray reservation can be revoked when at least one of the following occurs. For example, the tray reservation can be revoked after a pre-defined time is lapsed. In other example, the tray reservation can be revoked when the document is printed successfully using the reserved tray. In further example, the tray reservation can be revoked when one or more special media sheets are taken out from the reserved tray. In additional example, the tray reservation can be revoked if the one or more special media sheets are not loaded by the user within a pre-defined time such as 5 mins, 1 mins or the like.

Additionally, a remind me option is displayed to the user. If the user wishes to print more documents, the user selects the displayed option for printing. The prompt is shown again after some time.

The present disclosure discloses methods and systems to reserve a tray for a user for special media printing. The tray is reserved for a given user ID (User A) until he/she completes all his intended print jobs from the respective tray.

The methods and systems increase the convenience and flexibility for the user to print his documents/content on the special media as other users are not allowed to print their documents/content using the special media sheets in the reserved tray till a pre-defined time and/or the document of the user is printed successfully using the reserved tray. The methods and systems eliminate the incorrect or unintended content being printed on the special media. For example, the methods and systems overcome the problem where other users print their content using special media loaded by someone else. The methods and systems eliminate redundant printing, thereby saving resources such as toner, pages etc. The methods and systems enhance user experience and is very easy to implement.

The present disclosure successfully prints the user's job using special media sheets without any issue. The methods and systems ensure that once the tray is reserved for the user, no other user can use that reserved tray. As a result, the user does not have to worry about any such scenarios where other users can use the reserved tray. Also, the methods and systems avoid any conflict between the users.

The methods and systems allow tray reservation for individual users for their jobs. The methods and systems provide automatic workflow to ensure only intended job gets printed on special media sheets. The methods and systems further provide auto resumption of tray setting upon job completion. At the time of printing, the methods and systems ensure that the multi-function device does not consider the reserved tray or ignore the reserved tray or special media sheets loaded in the reserved tray for printing other user's job.

The present disclosure proposes a simple yet effective way to temporarily dedicate a tray for use by a particular user. The tray is dedicated such that only the corresponding user's job can access the tray.

The methods and systems prevent tray switching scenarios and prevent other jobs from using special media printing, for example, letterhead.

The present disclosure provides an easy way to reserve a tray while submitting one or more documents from a print driver.

The present disclosure provides a feature of tray reservation through a print driver application i.e., at the time of submitting a document for printing and reduces several steps in the workflow As the user first reserves the tray and can later keep the intended media sheets in the reserved tray to get a final printed document.

The disclosure may be implemented for media aliases scenarios that can limit media access to a particular user.

Although the disclosure is discussed where tray reservation is implemented for special media printing, but the disclosure can be implemented for other scenarios. For example, the tray reservation can be implemented for regular media printing.

The present disclosure further incorporates content related to tray reservation as disclosed in Attorney Docket No, 20200573US01, titled "METHODS AND SYSTEMS FOR RESERVING A TRAY FOR A USER FOR SPECIAL MEDIA PRINTING" in the name of Xerox corp.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown), The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is, generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that ail of these and similar terms are to be associated with the appropriate physical quantities and are merely convenient labels applied to these quantities. Unless specifically stated otherwise, as apparent from the discussion herein, it is appreciated that throughout the description, discussions utilizing terms such as reserving, mapping, receiving, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented arid as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for allowing a user to reserve a tray in a mufti-function device for special media printing while submitting a document for printing, the method is implemented at a print driver application running on a computing device, the print driver application being operative of at least one multi-function device, the method comprising:
   receiving a print request for the document through the print driver application;
   providing a user interface to the user comprising one or more print attributes, wherein at least one print attribute comprises special media type;
   upon selection of the special media type by the user, displaying a list of one or more trays available at the at least one multi-function device for special media printing;
   allowing the user to select a tray from the displayed list and reserve the selectedtray at the at least one multi-function device for special media printing; and
   authenticating the user upon loading one or more special media sheets in the reserved tray for special media printing.

2. The method of claim 1, further comprising, upon selection of the special media type, checking with the user for tray reservation for printing the document using the reserved tray.

3. The method of claim 1, further comprising, obtaining the list of one or more available trays from the at least one multi-function device, in real-time.

4. The method of claim 1, further comprising, identifying a user ID of the user.

5. The method of claim 1, further comprising, sending the user request to reserve the selected tray to the at least one multi-function device.

6. The method of claim 5, wherein sending the user request comprises at least:
   the document to be printed, special media details, the selection of the tray to be reservedfor the user, and a user ID.

7. The method of claim 1, further comprising, reserving the selected tray for the user at the at least one multi-function device, based on a user ID and a tray ID.

8. The method of claim 1, further comprising, printing the document of the user on the one or more special media sheets loaded in the reserved tray, based on successful authentication.

9. The method of claim 1, further comprising, printing the document of the user using other available trays at the at least one multi-function device, if the authentication fails.

10. The method of claim 1, further comprising, reserving the selected tray for a pre-defined time.

11. The method of claim 1, further comprising, reserving the selected tray till the document is printed using the reserved tray or till one or more special media sheets are taken out from the reserved tray.

12. The method of claim 1, further comprising, automatically revoking the tray reservation when at least one of the following occurs:
   i. after a pre-defined time is lapsed,
   ii. when the document is printed successfully using the reserved tray,
   iii. when one or more special media sheets are taken out from the reserved tray or
   iv. if the one or more special media sheets are not loaded by the user within a pre-defined time.

13. A computing device for allowing a user to reserve a tray for special media printing while submitting a document for printing, the computing device communicatively coupled to at least one multi-function device, comprising:
   a print driver application running on the computing device for:
   receiving a print request for the document;
   providing a user interface to the user comprising one or more printattributes, wherein at least one print attribute comprises special media option;
   upon selection of the special media option, displaying a list of one or more trays available for special media printing at the at least one mufti-function device; and
   allowing the user to select a tray for reservation for special media printingat the at least one multi-function device, wherein the user is authenticated upon loading one or more special media sheets in the reserved tray at the at least one mufti-function device.

14. The computing device of claim 13 is for sending the user request to reserve the selected tray to the at least one multi-function device.

15. The computing device of claim 14, wherein sending the user request comprises at least: the document for printing, special media details, the selection of the tray to be reserved for the user, and a user ID.

16. The computing device of claim 14, wherein the at least one multi-function device is for reserving the selected tray for the user based on a user ID and a tray ID at the at least one multi-function device.

17. The computing device of claim 13, wherein the at least one multi-function device is for printing the document of the user on the one or more special media sheets loaded in the reserved tray, based on successful authentication.

18. The computing device of claim 13, wherein the at least one multi-function device is for printing the document of the user using other available trays at the at least one multi-function device, if the authentication of the user fails.

19. The computing device of claim 13, wherein the at least one multi-function device is for automatically revoking the tray reservation when at least one of the following occurs:
   i. after a pre-defined time is lapsed,
   ii. when the document is printed successfully using the reserved tray,
   iii. when one or more special media sheets are taken out from the reserved tray or
   iv. if the one or more special media sheets are not loaded by the user within a pre-defined time.

20. A system for allowing a user to reserve a tray for special media printing while submitting a document for printing, the system comprising:
   a computing device running a print driver application for:
   receiving a request for printing the document;
   providing a user interface to the user comprising one or more print attributes, wherein at least one print attribute comprises special media option;
   upon selection of the special media option by the user, displaying a list of trays available at at least one mufti-function device for special media printing; and
   allowing the user to select a tray from the displayed list for reservation for special media printing at the at least one multi-function device; and
   sending the user's request to reserve the selected tray to the at the leastone multi-function device; and
   the at least one multi-function device communicatively coupled to the computing device, for:
   reserving the tray for the user based on a user ID of he user and a tray ID of the selected tray at the at least one multi-function device;

authenticating the user upon loading one or more special media sheets inthe reserved tray; and printing the document of the user on the one or more special media sheets loaded in the reserved tray, based on successful authentication.

21. The system of claim 20, wherein the at least one multi-function device is for, printing the document using other available trays at the at least one mufti-function device if the authentication of the user fails.

* * * * *